United States Patent
Han et al.

(10) Patent No.: US 9,369,922 B2
(45) Date of Patent: Jun. 14, 2016

(54) PERIODIC CHANNEL STATE INFORMATION REPORTING FOR COORDINATED MULTIPOINT (COMP) SYSTEMS

(71) Applicant: INTEL CORPORATION, Santa Clara, CA (US)

(72) Inventors: Seunghee Han, Kyoungkido (KR); Alexei Davydov, Nizhny Novgorod (RU); Jong-Kae Fwu, Sunnyvale, CA (US); Kamran Etemad, Potomac, MD (US)

(73) Assignee: INTEL CORPORATION, Santa Clara, CA (US)

( * ) Notice: Subject to any disclaimer, the term of this patent is extended or adjusted under 35 U.S.C. 154(b) by 32 days.

(21) Appl. No.: 13/886,619

(22) Filed: May 3, 2013

(65) Prior Publication Data

US 2014/0036704 A1    Feb. 6, 2014

Related U.S. Application Data

(63) Continuation-in-part of application No. 13/688,794, filed on Nov. 29, 2012.

(60) Provisional application No. 61/679,627, filed on Aug. 3, 2012, provisional application No. 61/707,784, filed on Sep. 28, 2012.

(51) Int. Cl.
*H04W 28/12* (2009.01)
*H04L 1/16* (2006.01)
(Continued)

(52) U.S. Cl.
CPC ............ *H04W 28/12* (2013.01); *H04L 1/0026* (2013.01); *H04L 1/0031* (2013.01);
(Continued)

(58) Field of Classification Search
CPC ... H04L 5/0057; H04L 1/0026; H04L 1/0027; H04L 1/0031; H04L 5/0053; H04L 5/0055; H04W 72/1226
USPC .................................. 370/328, 329, 336, 535
See application file for complete search history.

(56) References Cited

U.S. PATENT DOCUMENTS

| 2010/0124926 A1 | 5/2010 | Klatt et al. |
| 2010/0246463 A1 | 9/2010 | Papasakellariou et al. |

(Continued)

FOREIGN PATENT DOCUMENTS

| CN | 102237968 A | 11/2011 |
| CN | 102237969 A | 11/2011 |

(Continued)

OTHER PUBLICATIONS

International Search Report and Written Opinion received for PCT Patent Application No. PCT/US2013/048019, mailed on Oct. 18, 2013, 12 Pages.

(Continued)

*Primary Examiner* — Hoang-Chuong Vu
(74) *Attorney, Agent, or Firm* — Thorpe North & Western, LLP

(57) ABSTRACT

Technology for periodic channel state information (CSI) reporting from a user equipment (UE) configured for carrier aggregation is disclosed. One method can include the UE generating a plurality of periodic CSI reports for transmission in a subframe for a plurality of CSI processes, wherein each periodic CSI report corresponds to a CSI process with a CSI process index. A single periodic CSI report from the plurality of periodic CSI reports may be selected to multiplex with a hybrid automatic repeat request-acknowledgement (HARQ-ACK) feedback. The periodic CSI report multiplex with the HARQ-ACK feedback and any scheduling request (SR) may be determined to have a bit size less than or equal to a physical uplink control channel (PUCCH) format 3 maximum payload bit size. The periodic CSI report multiplexed with the HARQ-ACK feedback and any SR may be transmitted to a serving cell.

21 Claims, 13 Drawing Sheets

(51) Int. Cl.
*H04L 1/00* (2006.01)
*H04W 28/06* (2009.01)
*H04W 72/12* (2009.01)
*H04L 5/00* (2006.01)
*H04L 1/18* (2006.01)

(52) U.S. Cl.
CPC ............ *H04L 1/1671* (2013.01); *H04L 1/1812* (2013.01); *H04L 5/0055* (2013.01); *H04W 28/065* (2013.01); *H04W 72/1284* (2013.01)

(56) References Cited

U.S. PATENT DOCUMENTS

| | | | |
|---|---|---|---|
| 2011/0141928 A1 | 6/2011 | Shin et al. | |
| 2011/0243066 A1* | 10/2011 | Nayeb Nazar et al. | 370/328 |
| 2011/0249578 A1* | 10/2011 | Nayeb Nazar et al. | 370/252 |
| 2011/0269490 A1* | 11/2011 | Earnshaw et al. | 455/509 |
| 2011/0286391 A1 | 11/2011 | Chen et al. | |
| 2012/0039252 A1 | 2/2012 | Damnjanovic et al. | |
| 2012/0140708 A1 | 6/2012 | Choudhury et al. | |
| 2013/0022019 A1 | 1/2013 | Han et al. | |
| 2013/0077514 A1* | 3/2013 | Dinan | H04L 5/0057 370/252 |
| 2013/0083748 A1* | 4/2013 | Li | 370/329 |
| 2013/0100919 A1 | 4/2013 | Han et al. | |
| 2013/0114455 A1* | 5/2013 | Yoo | H04W 24/00 370/252 |
| 2013/0148592 A1 | 6/2013 | Noh et al. | |
| 2013/0250879 A1 | 9/2013 | Ng et al. | |
| 2013/0258874 A1 | 10/2013 | Khoshnevis et al. | |
| 2013/0258960 A1* | 10/2013 | Chen | H04W 72/0406 370/329 |
| 2013/0272229 A1 | 10/2013 | Dinan | |
| 2013/0272230 A1 | 10/2013 | Dinan | |
| 2013/0272231 A1 | 10/2013 | Dinan | |
| 2013/0272233 A1 | 10/2013 | Dinan | |
| 2013/0279433 A1 | 10/2013 | Dinan | |
| 2013/0279434 A1 | 10/2013 | Dinan | |
| 2013/0279435 A1 | 10/2013 | Dinan | |
| 2013/2072232 | 10/2013 | Dinan | |
| 2013/0301448 A1* | 11/2013 | Sayana et al. | 370/252 |
| 2013/0301550 A1 | 11/2013 | Kim et al. | |
| 2013/0322376 A1* | 12/2013 | Marinier et al. | 370/329 |
| 2014/0010126 A1* | 1/2014 | Sayana et al. | 370/280 |
| 2014/0036664 A1 | 2/2014 | Han et al. | |
| 2014/0036704 A1 | 2/2014 | Han et al. | |
| 2014/0044083 A1 | 2/2014 | Kim et al. | |
| 2014/0078974 A1* | 3/2014 | Falahati et al. | 370/329 |
| 2014/0086174 A1* | 3/2014 | Nam et al. | 370/329 |
| 2014/0112300 A1 | 4/2014 | Han et al. | |
| 2014/0192760 A1* | 7/2014 | Pajukoski | H04L 5/0046 370/329 |
| 2015/0029964 A1* | 1/2015 | Seo | H04L 1/0027 370/329 |
| 2015/0365219 A1* | 12/2015 | Liu | H04W 24/10 370/329 |

FOREIGN PATENT DOCUMENTS

| | | |
|---|---|---|
| CN | 102291228 A | 12/2011 |
| EP | 2680477 A1 | 1/2014 |
| EP | 2880899 A1 | 6/2015 |
| EP | 2887725 A1 | 6/2015 |
| RU | 2273107 C2 | 3/2006 |
| WO | WO 2004/003771 A1 | 1/2004 |
| WO | WO 2007/103291 A1 | 9/2007 |
| WO | WO 2008/030897 | 3/2008 |
| WO | WO 2012/096393 A1 | 7/2012 |
| WO | WO 2014/022032 A1 | 2/2014 |

OTHER PUBLICATIONS

Fujitsu, "Email discussion [69-10]: Details of collision handling and compression/multiplexing in case of 2 or more CSIs being configured in the same reporting instance for CoMP CSI feedback" R1-122930, 3GPP TSG RAN WG1 #69, Prague, Czech Republic, May 21-25, 2012, 30 Pages.

Intel Corporation, "Periodic and aperiodic CSI feedback modes for DL CoMP" R1-122628, 3GPP TSG-RAN WG1 #69, Prague, Czech, May 21-25, 2012, 4 Pages.

LG Electronics, "Multi-cell Periodic CSI Transmission" R1-122269, 3GPP TSG—1-20 RAN WG1 #69, Prague, Czech, May 21-25 2012, 5 Pages.

Mediatek Inc., "Periodic CSI Feedback for CoMP" R1-122159, 3GPP TSG-RAN WG1 1-20 #69, Prague, Czech. May 21-25, 2012, 3 Pages.

NTT DOCOMO, "CSI Feedback Scheme for Rel-11 CoMP" R1-121979, 3GPP TSG RAN WG1 Meeting #69, Prague, Czech, Republic, May 21-25, 2012, 5 Pages.

3GPP TS 36.213 V11.0.0 (Sep. 2012), 3rd Generation Parnership Project; Technical Specification Group Radio Access Network; Evolved Universal Terrestrial Radio Access (E-UTRA); Physical layer procedures (Release 11). Sep. 2012 143 pages.

Alcatel-Lucent et al.; PUCCH Resource Allocation for DL CoMP; 3GPP TSG RAN WG1 Meeting #68bis, R1-121246; Mar. 26-30, 2012; 4 pages.

Interdigital Communications LLC et al.; Multiplexing CSI and A/N Using PUCCH F3;.3GPP TSG-RAN WG1, R1-113924; Nov. 14-18, 2011; 5 pages.

Swedish application 1350935-1; filing date Jun. 27, 2013; Intel Corporation; office action mailed Jun. 11, 2014.

Netherlands application 2011265; filing date Jun. 27, 2013; Intel Corporation; search report/written opinion mailed Mar. 26, 2014.

Belgian application 201300524; filing date Jun. 27, 2013; Intel Corporation; search report/written opinion mailed Mar. 11, 2014.

Spanish application P201331229; filing date Jun. 27, 2013; Intel Corporation; office action mailed Jun. 3 2014.

Spanish application P201331229; filing date Jun. 27, 2013; Intel Corporation; office action/search report dated Nov. 5, 2014.

Swedish application 1350935-1; filing date Jun. 27, 2013; Intel Corporation; office action dated Jan. 21, 2015.

U.S. Appl. No. 14/145,112, filed Dec. 31, 2013; Seunghee Han; office action dated Jan. 30, 2015.

U.S. Appl. No. 13/688,794, filed Nov. 29, 2012; Seunghee Han; office action dated Jan. 30, 2015.

* cited by examiner

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4+L | NA | 4+L |
| | | RI > 1 | NA | 7+L | NA | 4+L |
| 1a | Sub-band CQI / second PMI | 8 antenna ports RI = 1 | NA | 8+L | NA | NA |
| | | 8 antenna ports 1 < RI < 5 | NA | 9+L | NA | NA |
| | | 8 antenna ports RI > 4 | NA | 7+L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI / second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI / first PMI / second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |

FIG. 6

PERIODIC CHANNEL STATE INFORMATION REPORTING FOR COORDINATED MULTIPOINT (COMP) SYSTEMS

RELATED APPLICATIONS

The present application is a continuation-in-part of U.S. patent application Ser. No. 13/688,794, filed Nov. 29, 2012, which claims priority to U.S. Provisional Patent Application Ser. No. 61/679,627, filed Aug. 3, 2012. The present application also claims priority to U.S. Provisional Patent Application No. 61/707,784, filed Sep. 28, 2012, all of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

A Coordinated MultiPoint (CoMP) system may also be used to reduce interference from neighboring nodes in both homogeneous networks and HetNets. In the CoMP system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. CoMP operation can apply to downlink transmissions and uplink transmissions. Downlink CoMP operation can be divided into two categories: coordinated scheduling or coordinated beamforming (CS/CB or CS/CBF), and joint processing or joint transmission (JP/JT). With CS/CB, a given subframe can be transmitted from one cell to a given wireless device (e.g., UE), and the scheduling, including coordinated beamforming, is dynamically coordinated between the cells in order to control and/or reduce the interference between different transmissions. For joint processing, joint transmission can be performed by multiple cells to a wireless device (e.g., UE), in which multiple nodes transmit at the same time using the same time and frequency radio resources and/or dynamic cell selection. Uplink CoMP operation can be divided into two categories: joint reception (JR) and coordinated scheduling and beamforming (CS/CB). With JR, a physical uplink shared channel (PUSCH) transmitted by the wireless device (e.g., UE) can be received jointly at multiple points at a time frame. The set of the multiple points can constitute the CoMP reception point (RP) set, and can be included in part of UL CoMP cooperating set or in an entire UL CoMP cooperating set. JR can be used to improve the received signal quality. In CS/CB, user scheduling and precoding selection decisions can be made with coordination among points corresponding to the UL CoMP cooperating set. With CS/CB, PUSCH transmitted by the UE can be received at one point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a table of physical uplink control channel (PUCCH) reporting types per PUCCH reporting mode and mode state in accordance with an example;

Figure 1:
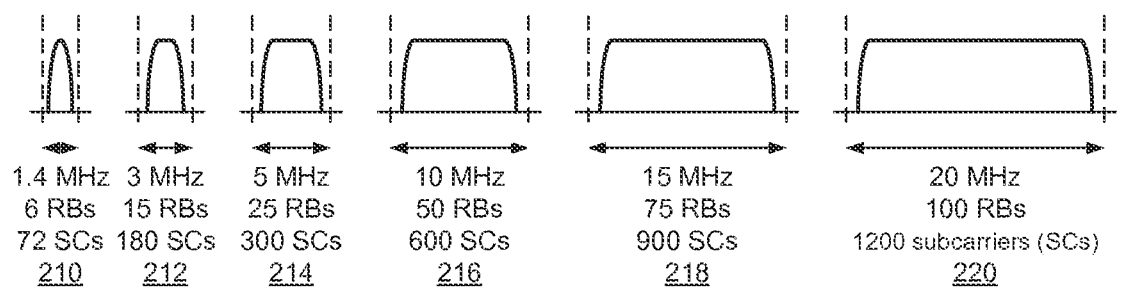
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
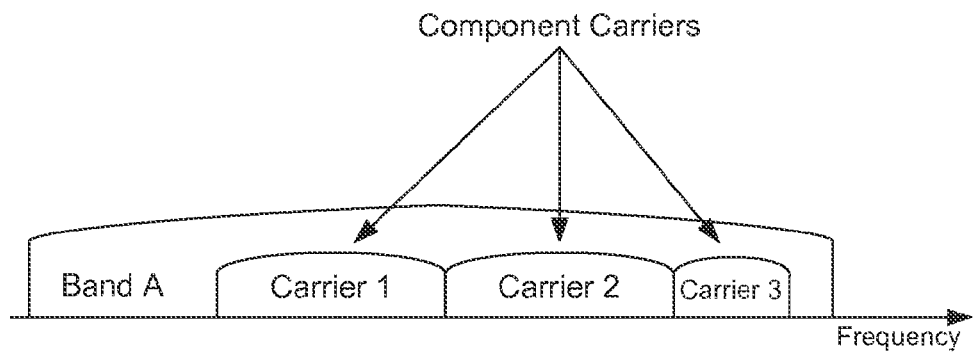
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
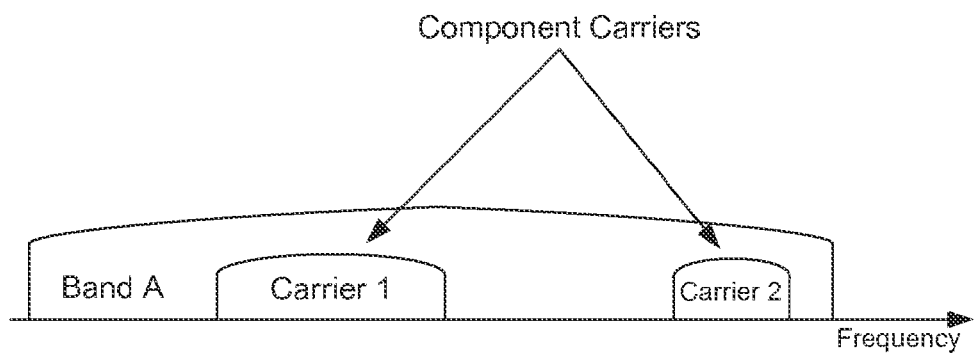
FIG. 2B illustrates a block diagram of intra-band non-contiguous component carriers in accordance with an example.
Figure 2C:
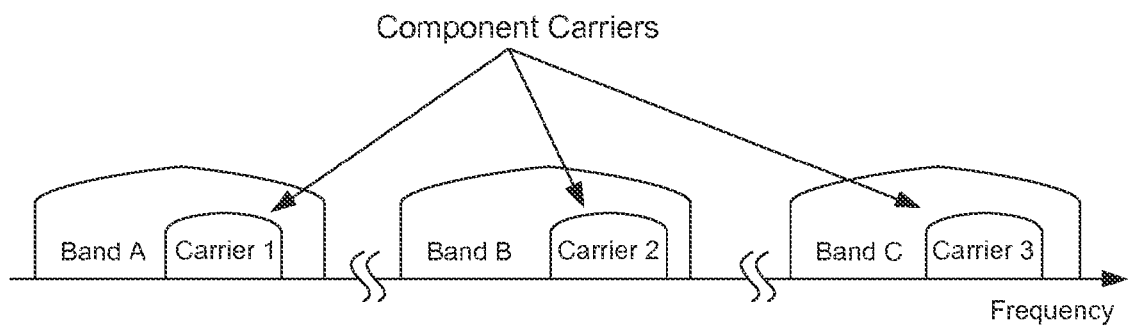
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
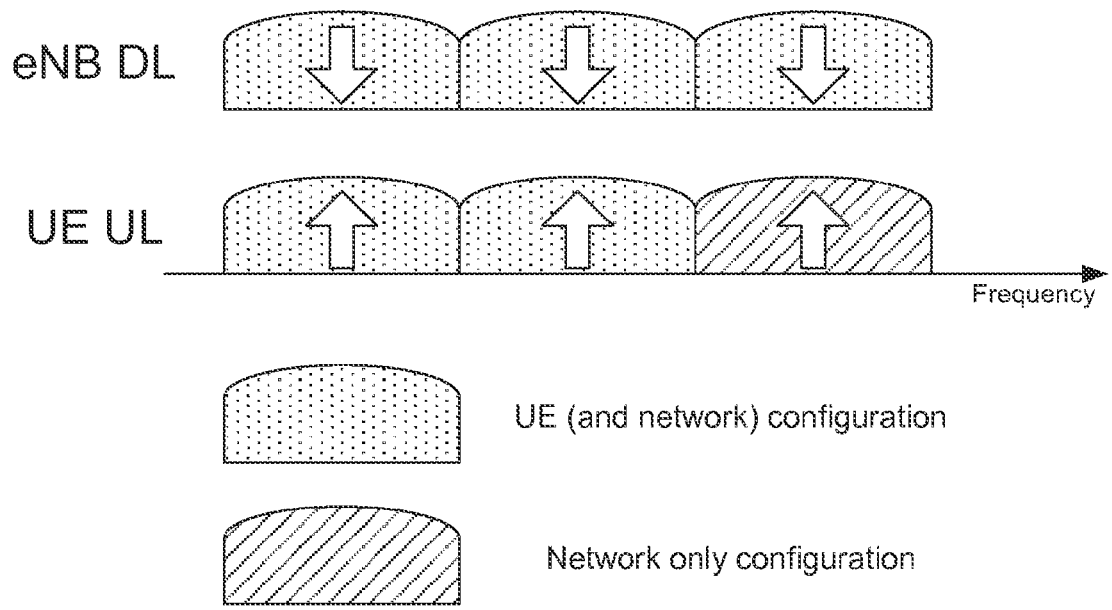
FIG. 3A illustrates a block diagram of a symmetric-asymmetric carrier aggregation configuration in accordance with an example.
Figure 3B:
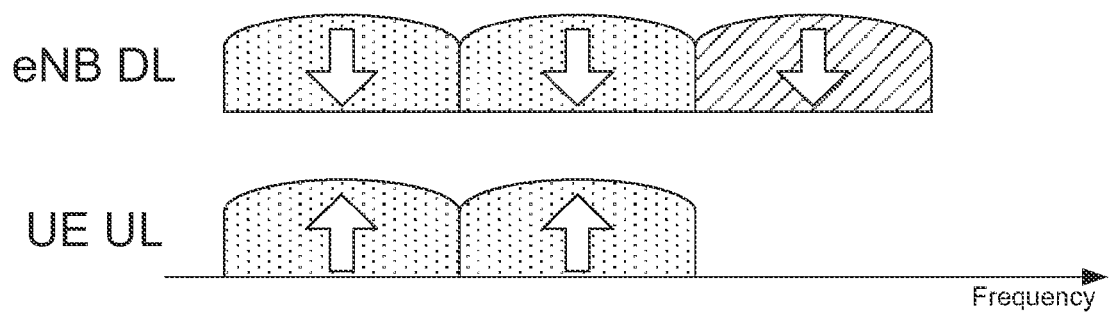
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL by means of signaling EUTRA Absolute Radio Frequency Channel Number (EARFCN) for the UL which is associated with a corresponding DL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

Figure 4:
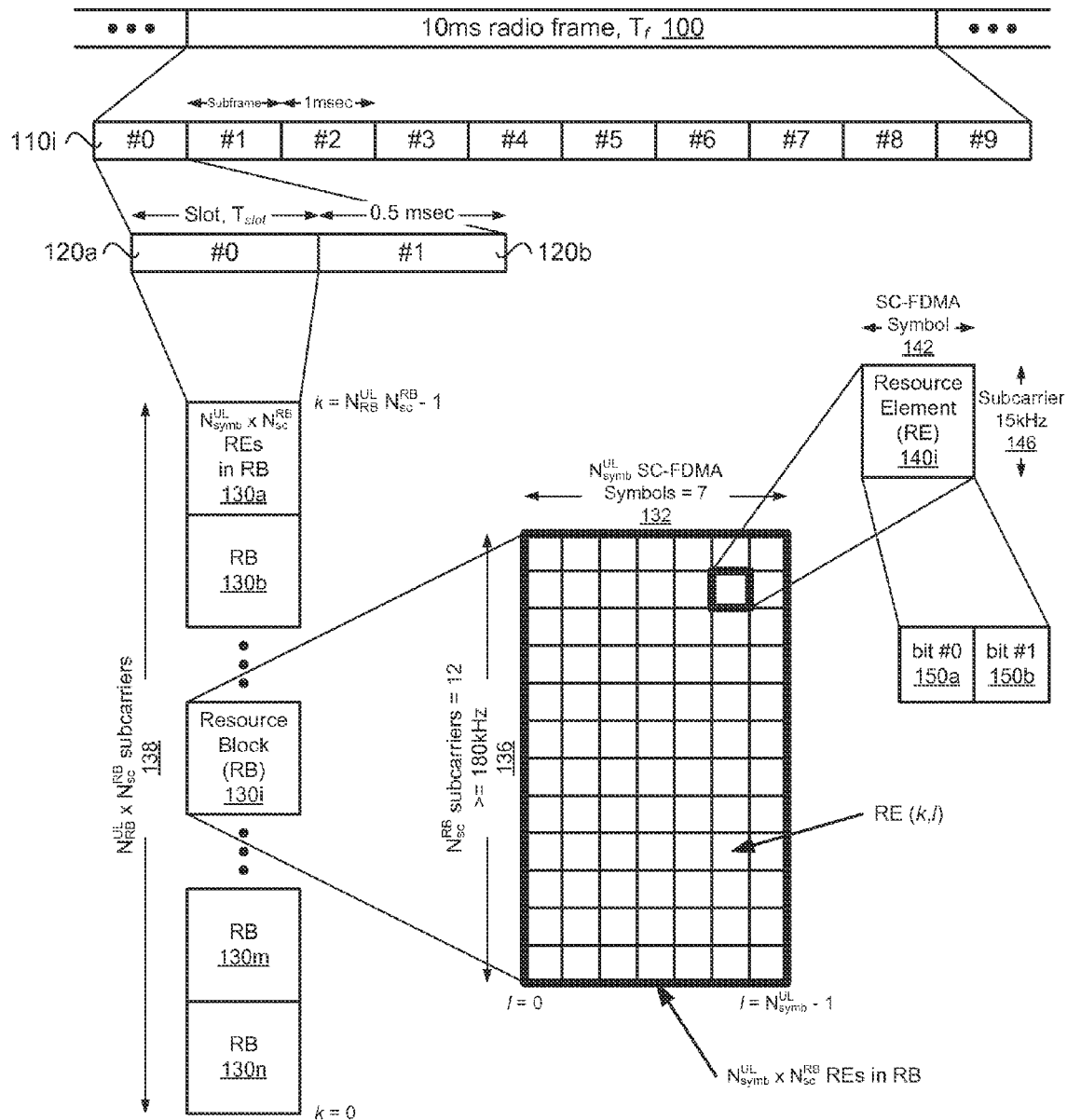
FIG. 4 illustrates a block diagram of uplink radio frame resources (e.g., a resource grid) in accordance with an example.

A component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates an uplink radio frame structure. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

Reference signals (RS) can be transmitted by SC-FDMA symbols via resource elements in the resource blocks. Reference signals (or pilot signals or tones) can be a known signal used for various reasons, such as to synchronize timing, estimate a channel, and/or noise in the channel. Reference signals can be received and transmitted by wireless devices and nodes. Different types of reference signals (RS) can be used in a RB. For example, in LTE systems, uplink reference signal types can include a sounding reference signal (SRS) and a UE-specific reference signal (UE-specific RS or UE-RS) or a demodulation reference signal (DM-RS). In LTE systems, downlink reference signal types can include channel state information reference signals (CSI-RS) which can be measured by a wireless device to provide CSI reports on a channel.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device can provide aperiodic CSI reporting using the PUSCH or periodic CSI reporting using PUCCH. The PUCCH can support multiple formats (i.e., PUCCH format) with various modulation and coding schemes (MCS), as shown for LTE in Table 1. For example, PUCCH format 3 can be used to convey multi-bit HARQ-ACK, which can be used for a UE supporting carrier aggregation in Time Division Duplex (TDD).

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Figure 5:
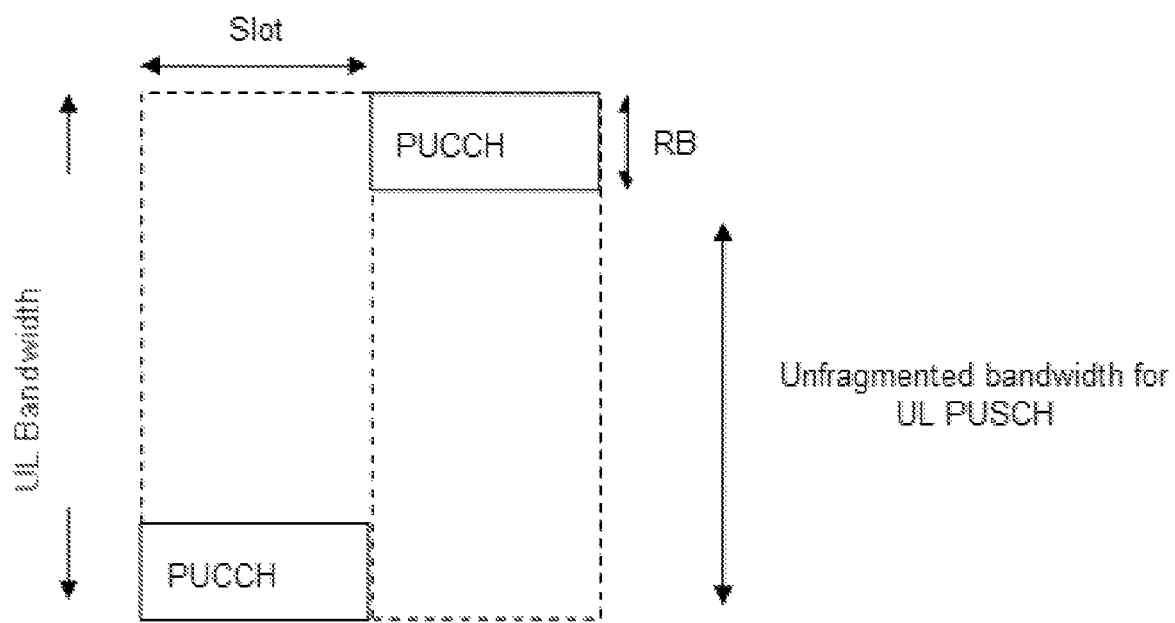
FIG. 5 illustrates a block diagram of frequency hopping for a physical uplink control channel (PUCCH) in accordance with an example.

In another example, PUCCH format 2 can use frequency hopping, as illustrated in FIG. 5. Frequency hopping can be a method of transmitting radio signals by rapidly switching a carrier among many frequency channels using a pseudorandom sequence or specified sequence known to both a transmitter (e.g., UE in an uplink) and a receiver (e.g., eNB in the uplink). Frequency hopping can enable the UE to exploit the frequency diversity of a wideband channel used in LTE in an uplink while keeping a contiguous allocation (in the time domain).

The PUCCH can include various channel state information (CSI) reports. The CSI components in the CSI reports can include a channel quality indicator (CQI), a precoding matrix indicator (PMI), a precoding type indicator (PTI), and/or rank indication (RI) reporting type. The CQI can be signaled by a UE to the eNodeB to indicate a suitable data rate, such as a modulation and coding scheme (MCS) value, for downlink transmissions, which can be based on a measurement of the received downlink signal to interference plus noise ratio (SINR) and knowledge of the UE's receiver characteristics. The PMI can be a signal fed back by the UE to support multiple-input multiple-output (MIMO) operation. The PMI can correspond to an index of the precoder (within a codebook shared by the UE and eNodeB), which can maximize an aggregate number of data bits which can be received across all downlink spatial transmission layers. PTI can be used to distinguish slow from fast fading environments. The RI can be signaled to the eNodeB by UEs configured for PDSCH transmission modes 3 (e.g., open-loop spatial multiplexing) and 4 (e.g., closed-loop spatial multiplexing). RI can correspond to a number of useful transmission layers for spatial multiplexing (based on the UE's estimate of the downlink channel), enabling the eNodeB to adapt the PDSCH transmissions accordingly.

The granularity of a CQI report can be divided into three levels: wideband, UE selected subband, and higher layer configured subband. The wideband CQI report can provide one CQI value for an entire downlink system bandwidth. The UE selected subband CQI report can divide the system bandwidth into multiple subbands, where the UE can select a set of preferred subbands (the best M subbands), then report one CQI value for the wideband and one differential CQI value for the set (assuming transmission only over the selected M subbands). The higher layer configured subband CQI report can provide a highest granularity. In the higher layer configured subband CQI report, the wireless device can divide the entire system bandwidth into multiple subbands, then reports one wideband CQI value and multiple differential CQI values, such as one for each subband.

The UCI carried by the PUCCH can use different PUCCH reporting types (or CQI/PMI and RI reporting types) to specify which CSI reports are being transmitted. For example, PUCCH reporting Type 1 can support CQI feedback for UE selected sub-bands; Type 1a can support subband CQI and second PMI feedback; Type 2, Type 2b, and Type 2c can support wideband CQI and PMI feedback; Type 2a can support wideband PMI feedback; Type 3 can supports RI feedback; Type 4 can supports wideband CQI; Type 5 can support RI and wideband PMI feedback; and Type 6 can support RI and PTI feedback.

Different CSI components can be included based on the PUCCH reporting type. For example, RI can be included in PUCCH reporting types 3, 5, or 6. Wideband PTI can be included in PUCCH reporting type 6. Wideband PMI can be included in PUCCH reporting types 2a or 5. Wideband CQI can be included in PUCCH reporting types 2, 2b, 2c, or 4. Subband CQI can be included in PUCCH reporting types 1 or 1a.

The CQI/PMI and RI (PUCCH) reporting types with distinct periods and offsets can be supported for the PUCCH CSI reporting modes illustrated by the table in FIG. 5. FIG. 5 illustrates an example for LTE of the PUCCH reporting type and payload size per PUCCH reporting mode and mode state.

The CSI information reported can vary based on the downlink transmission scenarios used. The various scenarios for the downlink can be reflected in different transmission modes (TMs). For example, in LTE, TM 1 can use a single transmit antenna; TM 2 can use transmit diversity; TM 3 can use open loop spatial multiplexing with cyclic delay diversity (CDD); TM 4 can use closed loop spatial multiplexing; TM 5 can use multi-user MIMO (MU-MIMO); TM 6 can use closed loop spatial multiplexing using a single transmission layer; TM 7 can use beamforming with UE-specific RS; TM 8 can use single or dual-layer beamforming with UE-specific RS; and TM 9 can use a multilayer transmission to support closed-loop single user MIMO (SU-MIMO) or carrier aggregation. In an example, TM 10 can be used for coordinated multipoint (CoMP) signaling, such as joint processing (JP), dynamic point selection (DPS), and/or coordinated scheduling/coordinated beamforming (CS/CB).

Each transmission mode can use different PUCCH CSI reporting modes, where each PUCCH CSI reporting mode can represent different CQI and PMI feedback types, as shown for LTE in Table 2.

TABLE 2

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For example, in LTE, TMs 1, 2, 3, and 7 can use PUCCH CSI reporting modes 1-0 or 2-0; TMs 4, 5, and 6 can use PUCCH CSI reporting modes 1-1 or 2-1; TM 8 can use PUCCH CSI reporting modes 1-1 or 2-1 if the UE is configured with PMI/RI reporting, or PUCCH CSI reporting modes 1-0 or 2-0 if the UE is configured without PMI/RI reporting; and TMs 9 and 10 can use PUCCH CSI reporting modes 1-1 or 2-1 if the UE is configured with PMI/RI reporting and number of CSI-RS ports is greater than one, or PUCCH CSI reporting modes 1-0 or 2-0 if the UE is configured without PMI/RI reporting or number of CSI-RS ports is equal to one. Based on the downlink transmission scheme (e.g., transmission mode), a UE can generate more CSI reports than may be permitted to be transmitted to nodes (e.g., eNBs) without generating a signal collision or interference. The wireless device (e.g. UE) may make a determination on the CSI reports to keep and transmit and which CSI reports to drop or discard (and not transmit) to avoid a collision on a subframe.

In CSI reporting, the PUCCH format 2 can convey 4 to 11 CSI (CQI/PMI/PTI/RI) bits from the UE to the eNB. In carrier aggregation, each serving cell can be independently configured by radio resource control (RRC) signaling regarding a CSI configuration, such as a periodicity, a starting offset, or a PUCCH mode. However, the transmission of CSI using PUCCH format 2 may only be performed in primary cell. In an example using PUCCH format 2, one CSI report for a specified serving cell may be transmitted while the remaining CSI reports for other serving cells may be dropped when more than one CSI report for multiple serving cells has a potential to collide with each other in a same subframe. Dropping the CSI reports for other serving cells may prevent the collision of the CSI reports in the same subframe. In an example, the criteria used to determine the priority of a periodic CSI reports transmitted and the periodic CSI reports that are dropped can be based on a PUCCH reporting type with a lower CSI reporting type priority being dropped. PUCCH reporting types 3, 5, 6, and 2a can have a highest or top priority, and PUCCH reporting types 2, 2b, 2c, and 4 can have a next priority or a second priority, and PUCCH reporting types 1 and 1a can have a third or lowest priority. So, the UE can drop the CSI reports with PUCCH reporting types 1, 1a, first, then drop the CSI reports with PUCCH reporting types 2, 2b, 2c, and 4, second, then drop any CSI reports with PUCCH reporting types 3, 5, 6, and 2a above the number of CSI report(s) to be transmitted. In an example, a CSI report can be generated for each component carrier (CC). Each CC can be represented by a serving cell index (i.e., ServCellIndex). Among CSI reports having reporting types with a same priority (e.g., PUCCH reporting types 3, 5, 6, and 2a), a priority of a cell can decrease as the corresponding serving cell index (i.e., ServCellIndex) increases (i.e., the lower cell index has higher priority).

In another example, the CSI report priority can be based on the CSI component, where RI and wideband PMI reporting have a higher priority than CQI reporting, and wideband CQI reporting has a higher priority than subband CQI reporting.

RI can have a higher priority because RI can provide general information about a network channel condition. In an example, PMI and CQI can be dependent on RI. Wideband CQI can have higher priority than subband CQI, because wideband CQI can provide general quality information about a channel or to a worst case scenario of the channel, whereas the subband CQI provides narrower subband channel quality information.

In an example, additional CSI reports can be generated in a Coordinated MultiPoint (CoMP) system. Additional criteria for dropping CSI reports may be used in a CoMP system. A CoMP system (also known as multi-eNodeB multiple input multiple output [MIMO]) can be used to improve interference mitigation. At least four basic scenarios can be used for CoMP operation.

Figure 7A:
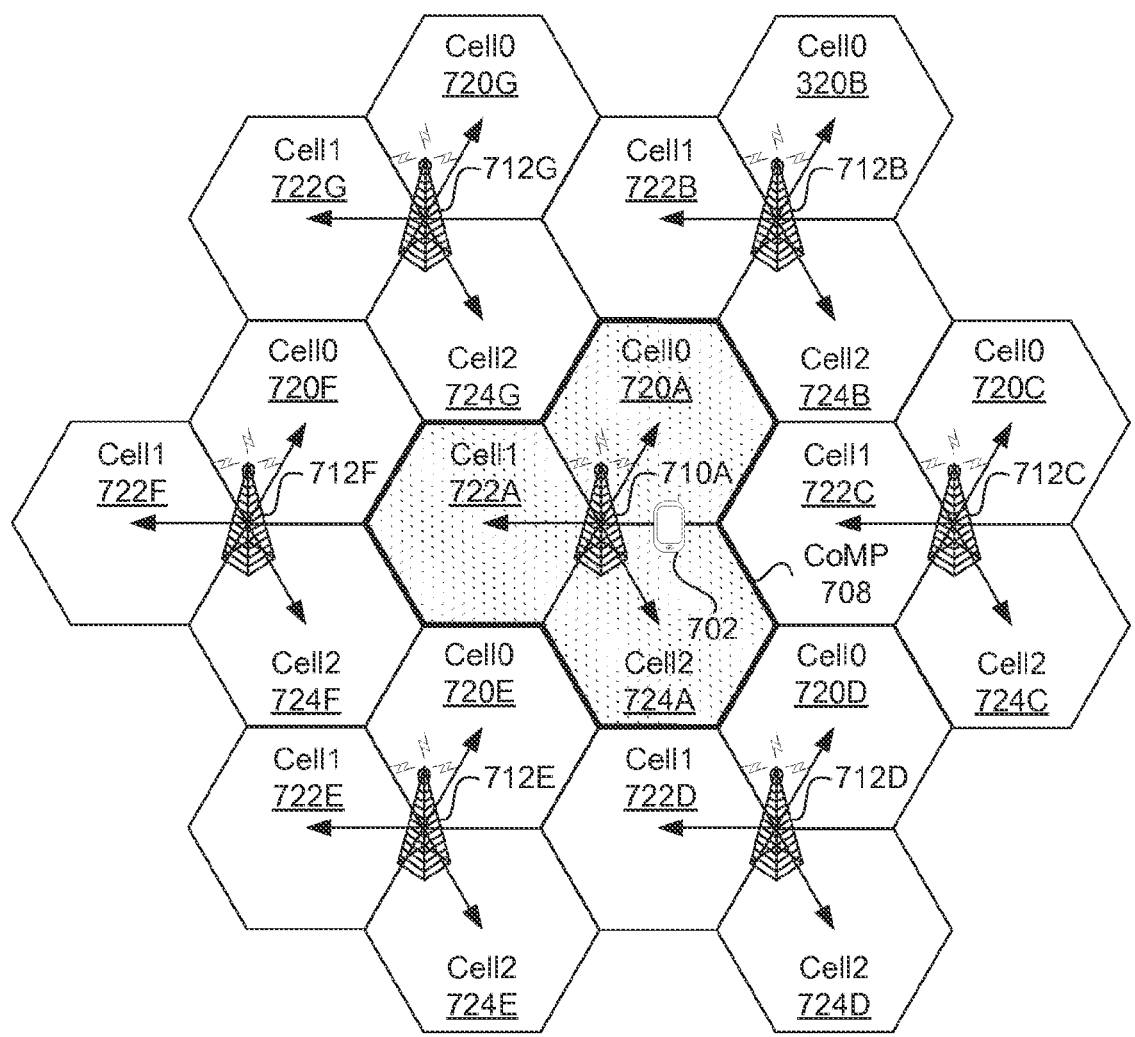
FIG. 7A illustrates a block diagram of a homogenous network using an intra-site coordinated multipoint (CoMP) system (e.g., CoMP scenario 1) in accordance with an example.

FIG. 7A illustrates an example of a coordination area 308 (outlined with a bold line) of an intra-site CoMP system in a homogenous network, which can illustrate LTE CoMP scenario 1. Each node 310A and 312B-G can serve multiple cells (or sectors) 320A-G, 322A-G, and 324A-G. The cell can be a logical definition generated by the node or geographic transmission area or sub-area (within a total coverage area) covered by the node, which can include a specific cell identification (ID) that defines the parameters for the cell, such as control channels, reference signals, and component carriers (CC) frequencies. By coordinating transmission among multiple cells, interference from other cells can be reduced and the received power of the desired signal can be increased. The nodes outside the CoMP system can be non-cooperating nodes 312B-G. In an example, the CoMP system can be illustrated as a plurality of cooperating nodes (not shown) surrounded by a plurality of non-cooperating nodes.

Figure 7B:
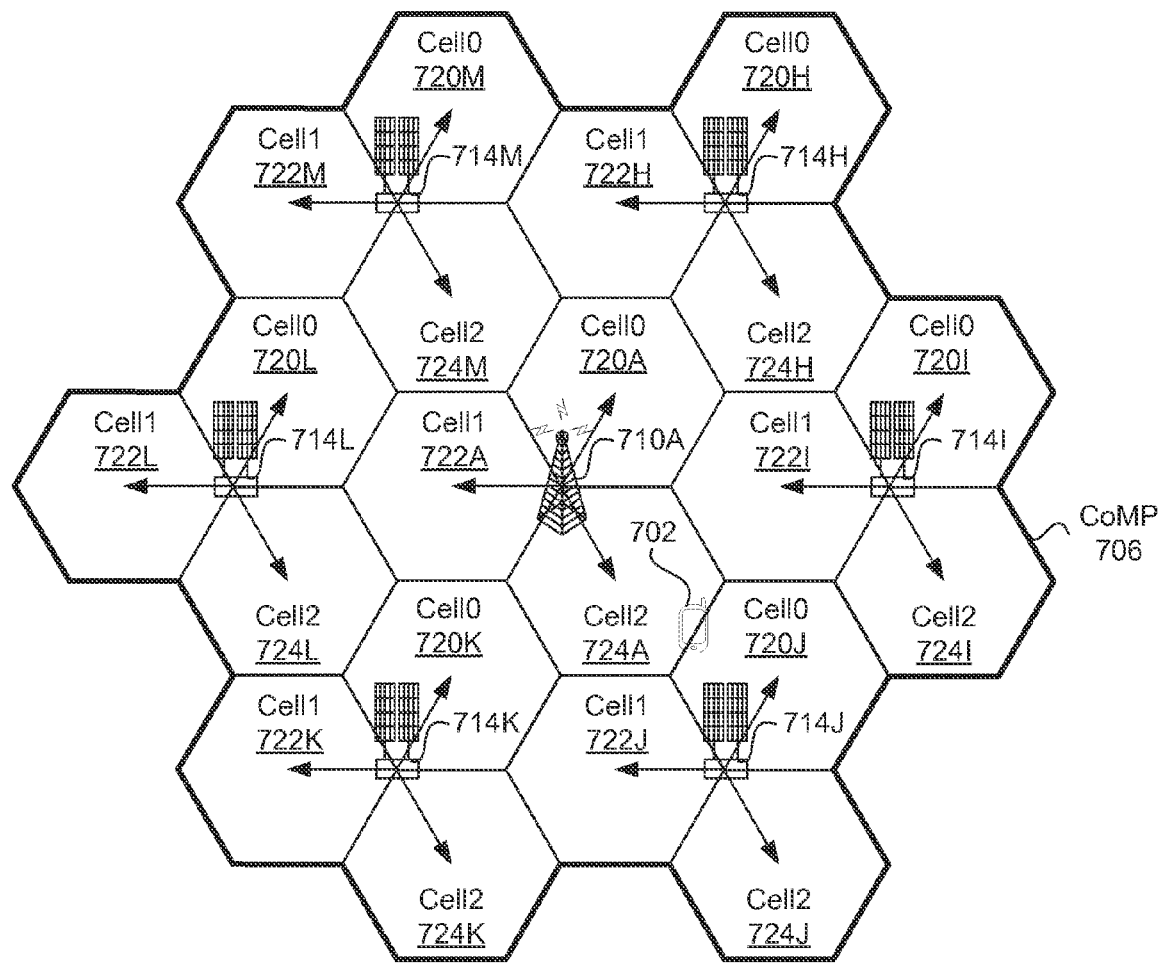
FIG. 7B illustrates a block diagram of a homogenous network with high transmission power using an inter-site coordinated multipoint (CoMP) system (e.g., CoMP scenario 2) in accordance with an example.

FIG. 7B illustrates an example of an inter-site CoMP system with high power remote radio heads (RRHs) in a homogenous network, which can illustrate LTE CoMP scenario 2. A coordination area 306 (outlined with a bold line) can include eNBs 310A and RRHs 314H-M, where each RRH can be configured to communicate with the eNB via a backhaul link (optical or wired link). The cooperating nodes can include eNBs and RRHs. In a CoMP system, the nodes can be grouped together as cooperating nodes in adjacent cells, where the cooperating nodes from multiple cells can transmit signals to the wireless device 302 and receive signals from the wireless device. The cooperating nodes can coordinate transmission/reception of signals from/to the wireless device 302 (e.g., UE). The cooperating node of each CoMP system can be included in a coordinating set. A CSI report may be generated on a CSI process based on transmissions from each coordinating set.

Figure 7C:
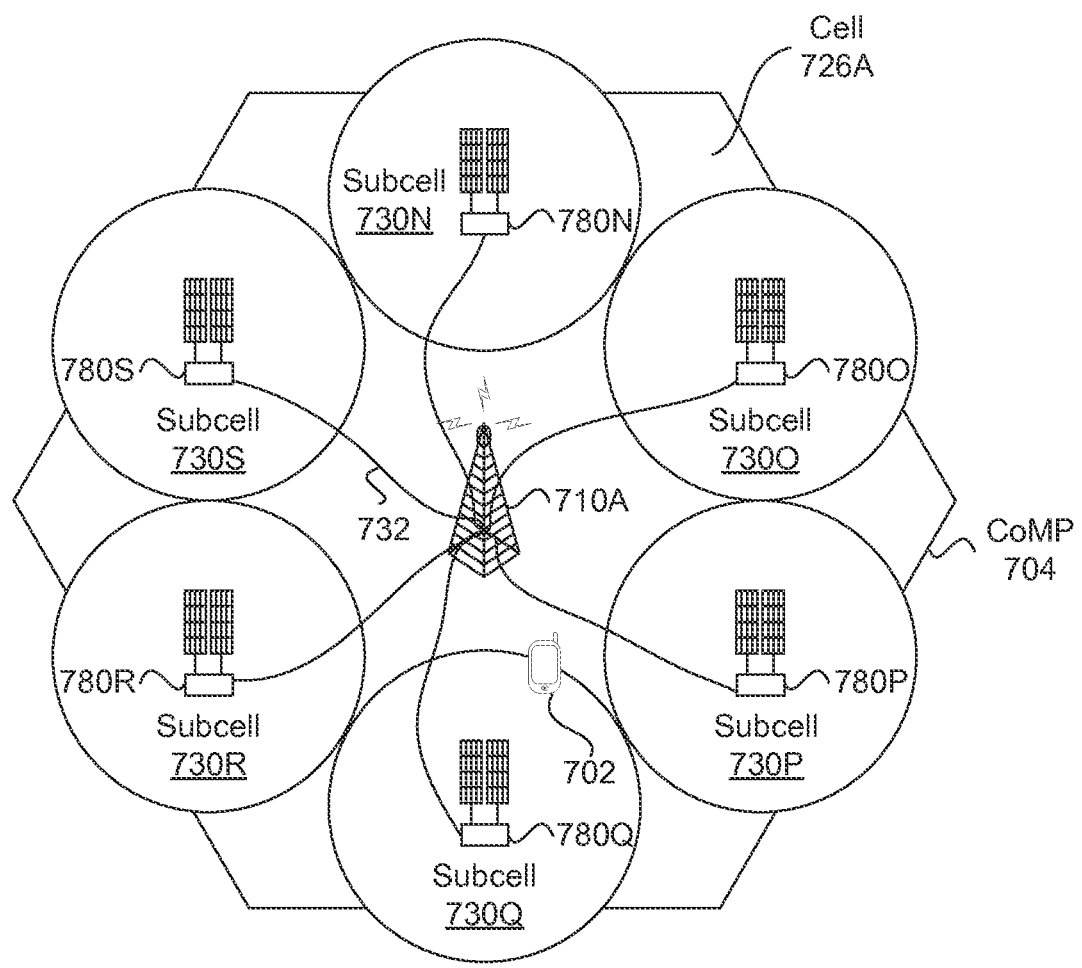
FIG. 7C illustrates a block diagram of a coordinated multipoint (CoMP) system in a heterogeneous network with low power nodes (e.g., CoMP scenario 3 or 4) in accordance with an example.

FIG. 7C illustrates an example of a CoMP system with low power nodes (LPNs) in a macro cell coverage area. FIG. 7C can illustrate LTE CoMP scenarios 3 and 4. In the intra-site CoMP example illustrated in FIG. 7C, LPNs (or RRHs) of a macro node 310A may be located at different locations in space, and CoMP coordination may be within a single macrocell. A coordination area 304 can include eNBs 310A and LPNs 380N-S, where each LPN can be configured to communicate with the eNB via a backhaul link 332 (optical or wired link). A cell 326A of a macro node may be further sub-divided into sub-cells 330N-S. LPNs (or RRHs) 380N-S may transmit and receive signals for a sub-cell. A wireless device 302 can be on a sub-cell edge (or cell-edge) and intra-site CoMP coordination can occur between the LPNs (or RRHs) or between the eNB and the LPNs. In CoMP scenario 3, the low power RRHs providing transmission/reception points within the macrocell coverage area can have different cell IDs from the macro cell. In CoMP scenario 4, the low power RRHs providing transmission/reception points within the macrocell coverage area can have a same cell ID as the macro cell.

Downlink (DL) CoMP transmission can be divided into two categories: coordinated scheduling or coordinated beamforming (CS/CB or CS/CBF), and joint processing or joint transmission (JP/JT). With CS/CB, a given subframe can be transmitted from one cell to a given mobile communication device (UE), and the scheduling, including coordinated beamforming, is dynamically coordinated between the cells in order to control and/or reduce the interference between different transmissions. For joint processing, joint transmission can be performed by multiple cells to a mobile communication device (UE), in which multiple nodes transmit at the same time using the same time and frequency radio resources and dynamic cell selection. Two methods can be used for joint transmission: non-coherent transmission, which uses soft-combining reception of the OFDM signal; and coherent transmission, which performs precoding between cells for in-phase combining at the receiver. By coordinating and combining signals from multiple antennas, CoMP, allows mobile users to enjoy consistent performance and quality for high-bandwidth services whether the mobile user is close to the center of a cell or at the outer edges of the cell.

Even with a single serving cell (i.e., single component carrier (CC) scenario), multiple periodic CSI reports may be transmitted for DL CoMP. The PUCCH report can define the format and uplink resources on which CSI can be provided, i.e., the PUCCH report configuration can define how to transmit the CSI feedback. For CoMP operations, measuring the CSI can be defined by a "CoMP CSI process", which can include a configuration of a channel and interference part. Therefore, different CSI reports can be associated with different processes. For example, the CoMP CSI measurement associated with one CoMP CSI process can be transmitted using periodic or aperiodic feedback modes.

The multiple periodic CSI processes can be configured by the network using certain IDs or index numbers in order to facilitate the multiple periodic CSI feedbacks. As used herein, the CSI process index (CSIProcessIndex or CSIProcessID) refers to such realization of multiple periodic CSI processes. For example, if a serving cell (e.g., serving node) configures three periodic CSI processes, the network can configure three CSI periodic processes and the CSIProcessIndex can be numbered as 0, 1, and 2. Each periodic CSI process can be configured by RRC signaling independently.

In legacy LTE, only one periodic CSI report may be transmitted by PUCCH format 2, 2a, or 2b. In a case, where more than one periodic CSI transmission coincides in a subframe, only one periodic CSI report may be transmitted and the remaining periodic CSI reports may be dropped. Although the multiple periodic CSI reports can be transmitted on either the PUCCH with PUCCH format 3 or the PUSCH, the maximum payload for aggregated periodic CSI can still be limited. For example, up to 22 information bits can be conveyed using PUCCH format 3. Thus, if the number of aggregated periodic CSI bits exceeds 22 bits, the remaining CSI reports may be dropped. In an example, if PUCCH format 2 is used for periodic CSI transmission, only one CSI process may be selected for the transmission regardless of the capacity criterion.

Various methods can be used to determine what CSI process or CSI report can be dropped when the CSIProcessID is used. For illustration purposes, the PUCCH with the PUCCH format 3, which can convey multiple CSI, is assumed, however the same principle can be used in other cases, such as other PUCCH formats or PUSCH.

If aggregated periodic CSI information bits do not exceed a maximum capacity of a certain PUCCH format (e.g., PUCCH format 2, PUCCH format 3, PUSCH, or other formats), the aggregated periodic CSI can be transmitted on the corresponding PUCCH format. Otherwise (i.e., if the aggregated periodic CSI information bits exceed the maximum capacity of the certain PUCCH format), the periodic CSIs among the CSI processes can be selected such that the aggregated periodic CSI payload is a largest number of CSI processes not more than the maximum capacity for the PUCCH format used in the PUCCH. For example, if the number of CSI processes is 5 and PUCCH format 3 is used and if the number of CSI bits is 11 for each CSI process, the CSI for only two CSI processes may be transmitted on PUCCH format 3 and the remaining 3 CSI processes may be dropped.

Various methods can be used to determine a priority rule for dropping CSI processes and/or reports. PUCCH using PUCCH format 3 with multi-process CSI transmission or PUCCH format 2 with a single CSI process can be used. For example, if the PUCCH uses PUCCH format 2 for periodic CSI transmission, only one CSI process may be selected for the transmission regardless of the capacity criterion.

In a method (i.e., method 1), the priority for retaining (or dropping) the CSI processes in a colliding subframe (or potentially colliding subframe) can first be determined by a PUCCH reporting type and/or PUCCH reporting mode. A first or highest priority CSI process can be given to PUCCH reporting Types 3, 5, 6, and 2a, then a next or second priority CSI process can be given to PUCCH reporting Types 2, 2b, 2c, and 4, then a third or last priority CSI process can be given to PUCCH reporting Types 1 and 1a.

If the aggregated number of CSI bits still exceeds 22 bits with PUCCH format 3 or more than one CSI process remains with PUCCH format 2, one of two rules can be used. Using a first rule, a CQI/PMI/PTI/RI reporting priorities among the CSI processes with a same priority of PUCCH reporting mode and/or types can be determined based on the CSI process index (e.g., CSIProcessID). For example, a priority of a CSI process ID decreases as the corresponding CSI process ID increases, thus a lower CSI process ID can have a higher priority. Using a second rule, the priority of the can be CSI process configured by RRC signaling.

In another method (i.e., method 2), a priority for retaining (or dropping) the CSI processes in a colliding subframe can be given by RRC signaling. In an example, a maximum capacity for PUCCH format 2 can be 11 bits, PUCCH format 3 can be 22 bits, and PUSCH can be 55 bits.

A priority for retaining (or dropping) the CSI reports can also be determined for a simultaneous usage of carrier aggregation (using a ServCellIndex) and CoMP scenarios (using a CSIProcessID or CSIProcessIndex), such as transmission mode 10. The priorities for dropping CSI reports can be defined considering both a carrier and CSI process domain.

For example, in a method (i.e., method A), the priority for the CSI processes and component carrier used for dropping (or retaining) CSI reports in a colliding subframe (or potentially colliding subframe) can first be based on a PUCCH reporting type and/or PUCCH reporting mode. A first or highest priority CSI process can be given to PUCCH reporting Types 3, 5, 6, and 2a, then a next or second priority CSI process can be given to PUCCH reporting Types 2, 2b, 2c, and 4, then a third or last priority CSI process can be given to PUCCH reporting Types 1 and 1a.

If an aggregated number of CSI bits is still more than 22 with PUCCH format 3 or more than one CSI process still remains with PUCCH format 2, one of three rules can be used. Using a first rule, a CQI/PMI/PTI/RI reporting priorities among the serving cells with the same priority of PUCCH reporting modes and/or types can be determined based on the serving cell indices (e.g., ServCellIndex). Priority of a cell can decrease as a corresponding serving cell index increases.

If the aggregated number of CSI bits is still more than 22 with PUCCH format 3 or more than one CSI process still remains with PUCCH format 2, the CQI/PMI/PTI/RI reporting priorities among the CSI processes with the same priority of PUCCH reporting mode and/or types and with a same serving cell index can be determined based on a CSI process index (e.g., CSIProcessID or CSIProcessIndex). Priority of a CSI process index can decrease as a corresponding CSI process index increases.

Using a second rule, the CQI/PMI/PTI/RI reporting priorities among the CSI processes for each serving cell with the same priority of PUCCH reporting mode and/or types can be determined based on the CSI process index (e.g., CSIProcessID or CSIProcessIndex). Priority of a CSI process index can decrease as a corresponding CSI process index increases.

If the aggregated number of CSI bits is still more than 22 with PUCCH format 3 or more than one CSI process still remains with PUCCH format 2, the CQI/PMI/PTI/RI reporting priorities among the serving cells with the same priority of PUCCH reporting mode and/or types and with a same CSI process index can be determined based on a serving cell index (e.g., ServCellIndex). Priority of a cell can decrease as a corresponding serving cell index increases.

Using a third rule, the priority across CCs used in carrier aggregation and/or CSI process indices used in CoMP scenarios can be configured by RRC signaling.

In another method (i.e., method B), all the priorities for the CSI processes used in CoMP scenarios and the component carrier used in carrier aggregation can be configured by RRC signaling.

In another method (i.e., method C), the CSI process index can be uniquely defined across serving cells and CSI processes (i.e., the unique CSI process index can be combination of the CSIProcessIndex and the ServCellIndex). In an example, the CSI process index can be determined and communicated via RRC signaling. For example, with two serving cell aggregations and three CSI processes per serving cell, the total number of CSI processes can be uniquely defined for 6 CSI processes (i.e., per CSI process 0, 1, 2, 3, 4, and 5.

Using a unique CSI process index, the priority for the CSI processes used for dropping (or retaining) CSI reports in a colliding subframe (or potentially colliding subframe) can first be based on a PUCCH reporting type and/or PUCCH reporting mode. A first or highest priority CSI process can be given to PUCCH reporting Types 3, 5, 6, and 2a, then a next or second priority CSI process can be given to PUCCH reporting Types 2, 2b, 2c, and 4, then a third or last priority CSI process can be given to PUCCH reporting Types 1 and 1a.

If an aggregated number of CSI bits is still more than 22 with PUCCH format 3 or more than one CSI process still remains with PUCCH format 2, the CQI/PMI/PTI/RI reporting priorities among the CSI processes with the priority of PUCCH reporting modes and/or types can be determined based on the CSI process index (e.g., CSIProcessID or CSIProcessIndex). Priority of a CSI process index can decrease as a corresponding CSI process index increases.

In another method (i.e., method D), a default CSI process index can be defined on each serving cell. Each default CSI process index can have a highest priority per each serving cell. Using a default CSI process index for each serving cell, the priority for the CSI processes used for dropping (or retaining) CSI reports in a colliding subframe (or potentially colliding subframe) can first be based on a PUCCH reporting type and/or PUCCH reporting mode. A first or highest priority CSI process can be given to PUCCH reporting Types 3, 5, 6, and 2a, then a next or second priority CSI process can be given to PUCCH reporting Types 2, 2b, 2c, and 4, then a third or last priority CSI process can be given to PUCCH reporting Types 1 and 1a.

If an aggregated number of CSI bits is still more than 22 with PUCCH format 3 or more than one CSI process still remains with PUCCH format 2, the CQI/PMI/PTI/RI reporting priorities among the default CSI processes with the priority of PUCCH reporting modes and/or types can be determined based on the CSI process index (e.g., CSIProcessID or CSIProcessIndex). Priority of a CSI process index can decrease as a corresponding CSI process index increases.

A combination of the various methods is also contemplated.

In another example, a dropping rule for a combined carrier aggregation and CoMP scenario can be used for multiplexing the CSI and HARQ-ACK using PUCCH format 3. Automatic Repeat reQuest is a feedback mechanism whereby a receiving terminal requests retransmission of packets which are detected to be erroneous. Hybrid ARQ is a simultaneous combination of Automatic Retransmission reQuest (ARQ) and forward error correction (FEC) which can enables the overhead of error correction to be adapted dynamically depending on the channel quality. When HARQ is used and if the errors can be corrected by FEC then no retransmission may be requested, otherwise if the errors can be detected but not corrected, a retransmission can be requested. An ACKnowledgment (ACK) signal can be transmitted to indicate that one or more blocks of data, such as in a PDSCH, have been successfully received and decoded. HARQ-ACK/Negative ACKnowledgement (NACK or NAK) information can include feedback from a receiver to the transmitter in order to acknowledge a correct reception of a packet or ask for a new retransmission (via NACK or NAK).

In an example, for a UE configured with PUCCH format 3 for HARQ-ACK transmission, and for a subframe where a UE is configured to transmit HARQ-ACK transmission with periodic CSI, and for a subframe where a PUCCH format 3 resource is indicated to the UE for HARQ-ACK transmission, the UE can transmit HARQ-ACK and a single cell periodic CSI report. In other words, the UE can multiplex the HARQ-ACK feedback with the periodic CSI report. No additional PUCCH format 3 resources in addition to the format 3 resource may be configured for HARQ-ACK and periodic CSI multiplexing. The UE may receive, through an ACK/NACK Resource Indicator (ARI) from the serving cell, an indication that the UE has a PUCCH format 3 resource to perform the HARQ-ACK transmissions. In particular, one or more transmission power control (TPC) commands in the downlink control information (DCI) may indicate the ARI to the UE.

The UE may transmit the periodic CSI report multiplexed with the HARQ-ACK feedback to the evolved node B (eNB) when the periodic CSI report multiplexed with the HARQ-ACK feedback has a bit size less than or equal to a payload bit size of a PUCCH format 3. The PUCCH format 3 has a maximum payload bit size of 22 aggregated information bits. Therefore, the HARQ-ACK and the periodic CSI, including any scheduling request (SR), can be transmitted when jointly coded up to or equal to 22 aggregated information bits. The SR may be a single bit of information that indicates the UE has new data to transmit.

In a combined carrier aggregation and CoMP case, only one CSI report may be selected for a combined CSI process and ACK/NACK (A/N) feedback on a PUCCH with PUCCH format 3. In other words, the UE transmits a single periodic CSI report corresponding to a single CoMP CSI process that is multiplexed with the HARQ-ACK feedback. Therefore, if a plurality of periodic CSI reports are generated, a single periodic CSI report can be selected from the plurality of periodic CSI reports and multiplexed with the HARQ/ACK feedback for transmission to the serving cell. The selected rule of method A, B, C, and D above can be used to select one periodic CSI report for the combined CSI process and A/N on the PUCCH with PUCCH format 3.

For example, the dropping rule using method A can be represented as follows: The priority for the CSI processes and component carrier used for dropping (or retaining) CSI reports in a colliding subframe (or potentially colliding subframe) can first be based on a PUCCH reporting type and/or PUCCH reporting mode. A first or highest priority CSI process can be given to PUCCH reporting Types 3, 5, 6, and 2a, then a next or second priority CSI process can be given to PUCCH reporting Types 2, 2b, 2c, and 4, then a third or last priority CSI process can be given to PUCCH reporting Types 1 and 1a.

If more than one CSI process still remains with PUCCH format 2, a CQI/PMI/PTI/RI reporting priorities among the CSI processes for each serving cell with the same priority of PUCCH reporting mode and/or types can determined based on the CSI process index (e.g., CSIProcessID or CSIProcessIndex). Priority of a CSI process index can decrease as a corresponding CSI process index increases.

Then if more than one CSI process still remains with PUCCH format 2, the CQI/PMI/PTI/RI reporting priorities among the serving cells with the same priority of PUCCH reporting mode and/or types and with a same CSI process index can be determined based on a serving cell index (e.g., ServCellIndex). Priority of a cell can decrease as a corresponding serving cell index increases.

Figure 8:
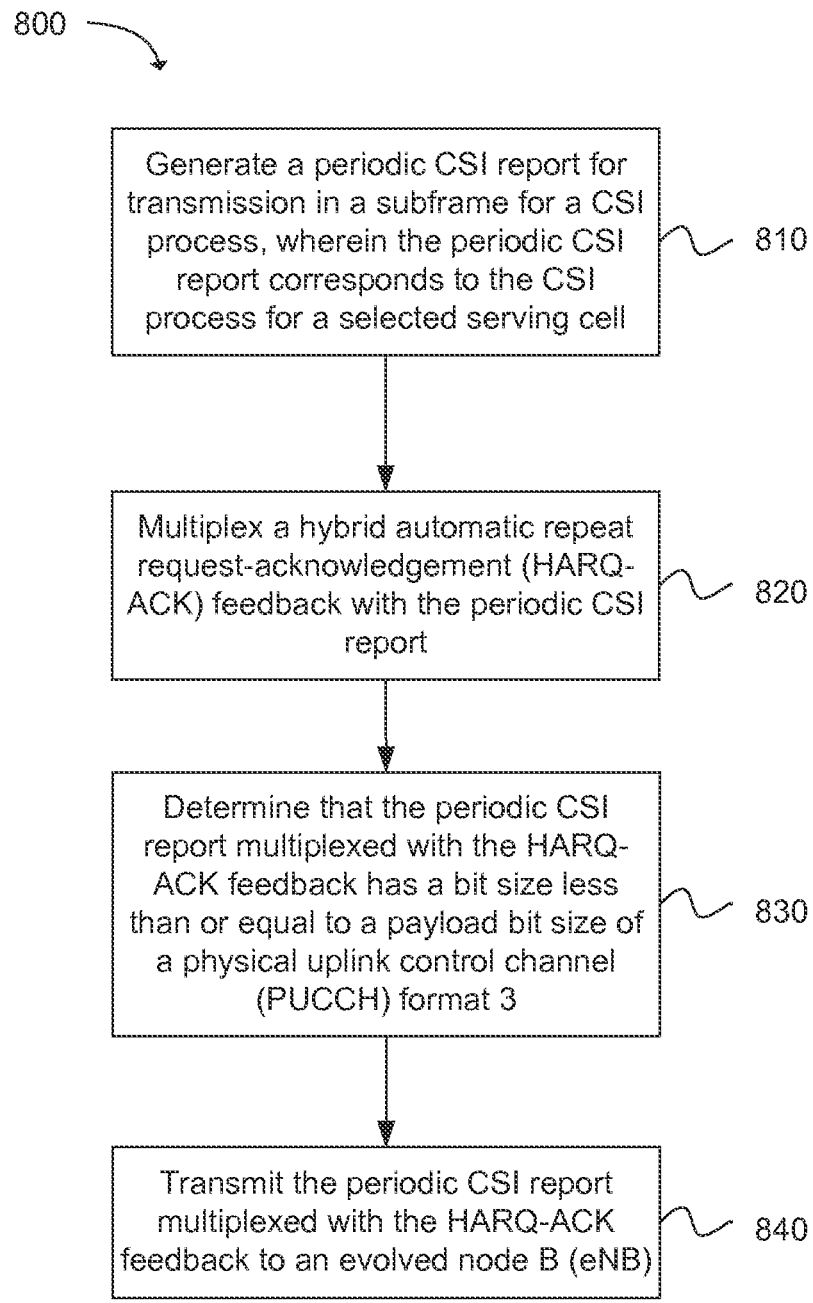
FIG. 8 depicts functionality of computer circuitry of a user equipment (UE) operable to report periodic channel state information (CSI) configured in a specified transmission mode in accordance with an example.

Another example provides functionality 800 of computer circuitry of a user equipment (UE) operable to report periodic channel state information (CSI), as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to generate a periodic CSI report for transmission in a subframe for a CSI process, wherein the periodic CSI report corresponds to the CSI process for a selected serving cell, as in block 810. The computer circuitry can be further configured to multiplex a hybrid automatic repeat request-acknowledgement (HARQ-ACK) feedback with the periodic CSI report, as in block 820. The computer circuitry can also be configured to determine that the periodic CSI report multiplexed with the HARQ-ACK feedback has a bit size less than or equal to a payload bit size in a physical uplink control channel (PUCCH) format 3, as in block 830. In addition, the computer circuitry may be configured to transmit the periodic CSI report multiplexed with the HARQ-ACK feedback to an evolved node B (eNB), as in block 840.

In one configuration, the computer circuitry may be configured to transmit the HARQ-ACK feedback without the periodic CSI report to the serving cell when the periodic CSI report multiplexed with the HARQ-ACK feedback has a bit size greater than the payload bit size in the PUCCH format 3. In one example, the payload bit size in the PUCCH format 3 has a maximum payload bit size of 22 aggregated information bits. In addition, the HARQ-ACK feedback includes a scheduling request (SR). In one example, the periodic CSI report corresponding to the CSI process relates to a scenario involving carrier aggregation and coordinated multipoint (CoMP) transmission.

In another example, the computer circuitry may be further configured to receive, through an ACK/NACK Resource Indicator (ARI) from the serving cell, an indication that the UE has a PUCCH format 3 resource to perform HARQ-ACK transmissions. For example, one or more transmission power control (TPC) commands in downlink control information (DCI) contents indicate the ARI. In addition, the UE is operable for carrier aggregation and transmits a single periodic CSI report corresponding to a single CSI process that is multiplexed with the HARQ-ACK feedback to the eNB.

Figure 9:
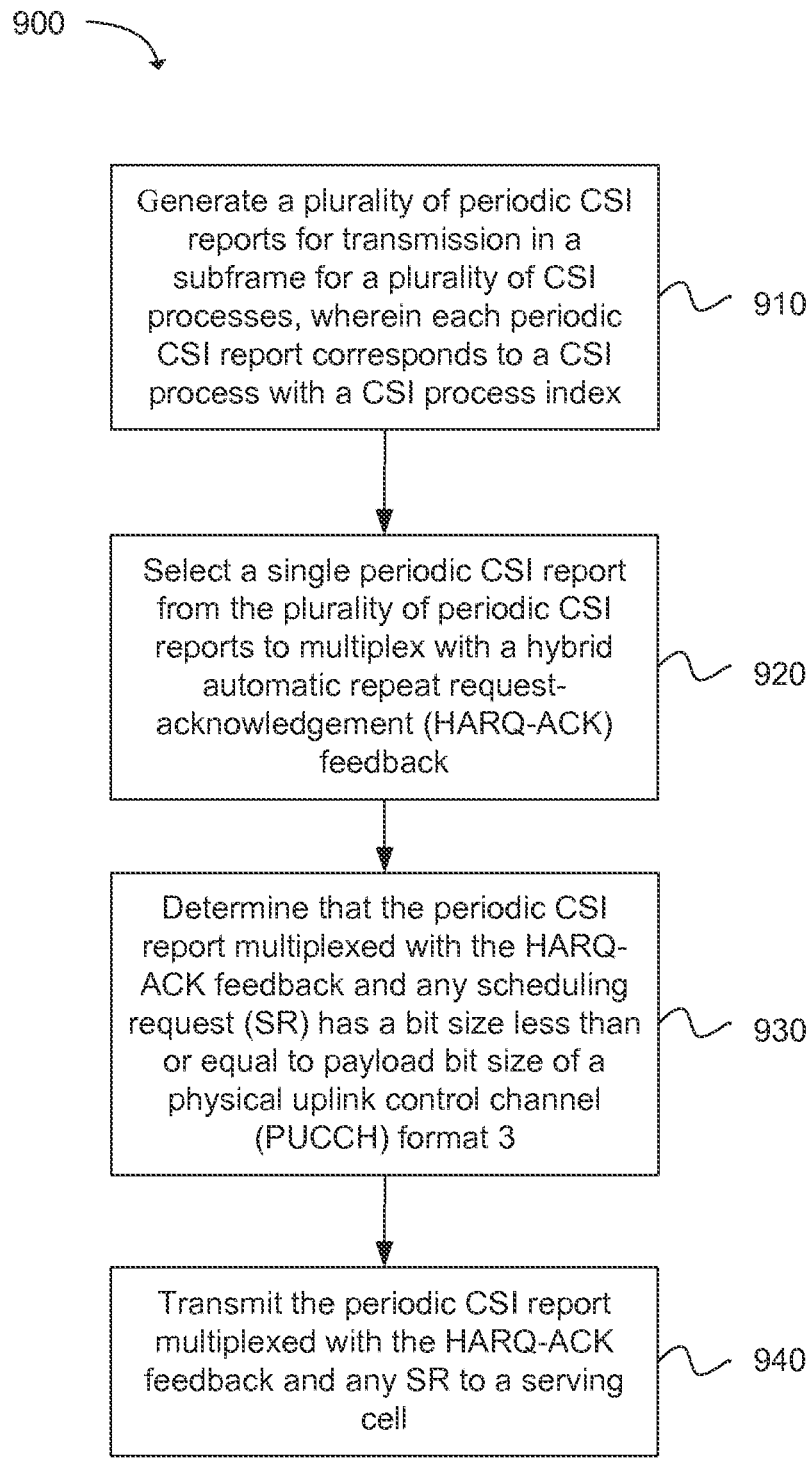
FIG. 9 depicts a flow chart of a method for periodic channel state information (CSI) reporting in a coordinated multipoint (CoMP) scenario at a wireless device in accordance with an example.

Another example provides a method 900 for periodic channel state information (CSI) reporting from a user equipment (UE) configured for carrier aggregation, as shown in the flow chart in FIG. 9. The method may be executed as instructions on a machine, where the instructions are included on at least one computer readable medium or one non-transitory machine readable storage medium. The method includes the operation of generating a plurality of periodic CSI reports for transmission in a subframe for a plurality of CSI processes, wherein each periodic CSI report corresponds to a CSI process with a CSI process index, as in block 910. The method can include selecting a single periodic CSI report from the plurality of periodic CSI reports to multiplex with a hybrid automatic repeat request-acknowledgement (HARQ-ACK) feedback, as in block 920. The next operation of the method can be determining that the periodic CSI report multiplexed with the HARQ-ACK feedback and any scheduling request (SR) has a bit size less than or equal to a payload bit size of an physical uplink control channel (PUCCH) format 3, as in block 930. The method can further include transmitting the periodic CSI report multiplexed with the HARQ-ACK feedback and any SR to a serving cell, as in block 940.

The operation of selecting the periodic CSI report can be based on at least one of a channel quality indicator (CQI), a precoding matrix indicator (PMI), or a rank indication (RI) reporting type (CQI/PMI/RI), wherein CQI/PMI/RI reporting types 3, 5, 6, and 2a have a priority higher than CQI/PMI/RI reporting types 1, 1a, 2, 2b, 2c, and 4, and CQI/PMI/RI reporting types 2, 2b, 2c, and 4 have a priority higher than CQI/PMI/RI reporting types 1 and 1a. In addition, the operation of selecting the periodic CSI report from the plurality of CSI reports can be based on a priority level of the CSI process index associated with PUCCH format 2, wherein a lower CSI process index indicates a higher priority CSI process.

In one example, the operation of selecting the periodic CSI report from the plurality of CSI reports can be based on a priority level of a serving cell index or a component carrier (CC), wherein the CC with a higher priority level has a lower serving cell index. In another example, the method may include transmitting the HARQ-ACK feedback including any SR without the periodic CSI report to the serving cell when the periodic CSI report multiplexed with the HARQ-ACK feedback and any SR has a payload bit size greater than the PUCCH format 3. In one example, the payload bit size in the PUCCH format 3 has a maximum payload bit size of 22 aggregated information bits. In one configuration, the periodic CSI report corresponding to the CSI process relates to a scenario involving carrier aggregation and coordinated multipoint (CoMP) transmission.

In addition, the CSI process for the periodic CSI report is related to a transmission mode 10 in Third Generation Partnership Project (3GPP) Long Term Evolution (LTE) Release 11.

In another example, the method can further include receiving, through an ACK/NACK Resource Indicator (ARI) from the serving cell, an indication that the UE has a PUCCH format 3 resource to perform HARQ-ACK transmissions. In addition, the serving cell is selected from a group comprising a base station (BS), a Node B (NB), an evolved Node B (eNB), a baseband unit (BBU), a remote radio head (RRH), a remote radio equipment (RRE), a sector, a frequency allocation (FA), or a remote radio unit (RRU).

Figure 10:
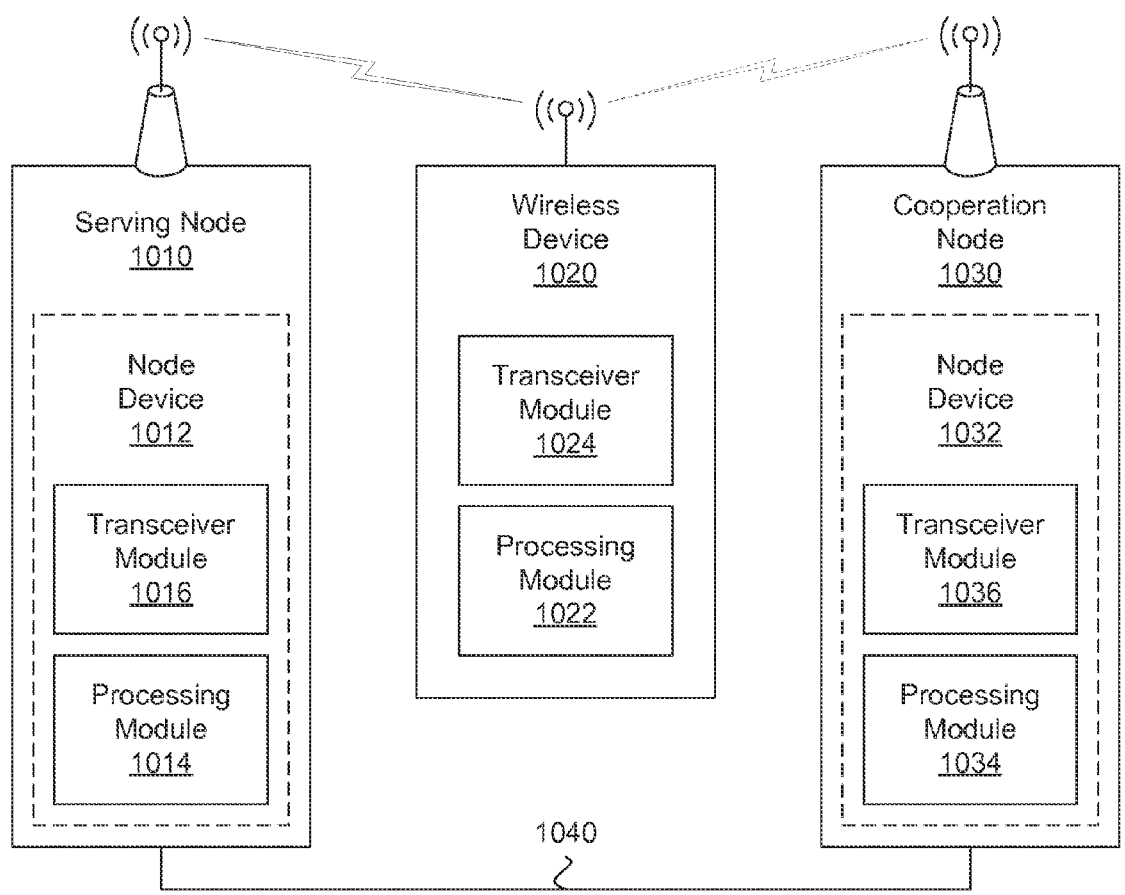
FIG. 10 illustrates a block diagram of a serving node, a coordination node, and wireless device in accordance with an example.

FIG. 10 illustrates an example node (e.g., serving node 1010 and cooperation node 1030) and an example wireless device 1020. The node can include a node device 1012 and 1032. The node device or the node can be configured to communicate with the wireless device. The node device can be configured to receive periodic channel state information (CSI) transmission configured in a specified transmission mode, such as transmission mode 10. The node device or the node can be configured to communicate with other nodes via a backhaul link 1040 (optical or wired link), such as an X2 application protocol (X2AP). The node device can include a processing module 1014 and 1034 and a transceiver module 1016 and 1036. The transceiver module can be configured to receive a periodic channel state information (CSI) in a PUCCH. The transceiver module 1016 and 1036 can be further configured to communicate with the coordination node via an X2 application protocol (X2AP). The processing module can be further configured to process the periodic CSI reports of the PUCCH. The node (e.g., serving node 1010 and cooperation node 1030) can include a base station (BS), a Node B (NB), an evolved Node B (eNB), a baseband unit (BBU), a remote radio head (RRH), a remote radio equipment (RRE), or a remote radio unit (RRU).

The wireless device 1020 can include a transceiver module 1024 and a processing module 1022. The wireless device can be configured for a periodic channel state information (CSI) transmission configured in a specified transmission mode, such as transmission mode used in a CoMP operation. The processing module 1022 can be configured to generate a plurality of periodic CSI reports for transmission in a subframe for a plurality CSI processes, wherein each periodic CSI report corresponds to a CSI process The processing module 1022 can be further configured to select a single periodic CSI report from the plurality of periodic CSI reports to multiplex with a hybrid automatic repeat request-acknowledgement (HARQ-ACK) feedback based on at least one of a channel quality indicator (CQI), a precoding matrix indicator (PMI), or a rank indication (RI) reporting type (CQI/PMI/RI). In addition, the processing module 1022 can be configured to determine that the periodic CSI report multiplexed with the HARQ-ACK feedback and any scheduling request (SR) has a bit size less than or equal to a payload bit size of a physical uplink control channel (PUCCH) format 3. The transceiver module 1024 can be configured to transmit the periodic CSI report multiplexed with the HARQ-ACK feedback and any SR to an evolved node B (eNB).

In a configuration, the transceiver module 1024 can be further configured to transmit the HARQ-ACK feedback without the periodic CSI report to the serving cell when the periodic CSI report multiplexed with the HARQ-ACK feedback has a bit size greater than the payload bit size of the PUCCH format 3. In one example, the payload bit size in the PUCCH format 3 has a maximum payload bit size of 22 aggregated information bits. In another configuration, the processing module 1022 can be further configured to receive, through an ACK/NACK Resource Indicator (ARI) from the serving cell, an indication that the UE has a PUCCH format 3 resource to perform HARQ-ACK transmissions.

Figure 11:
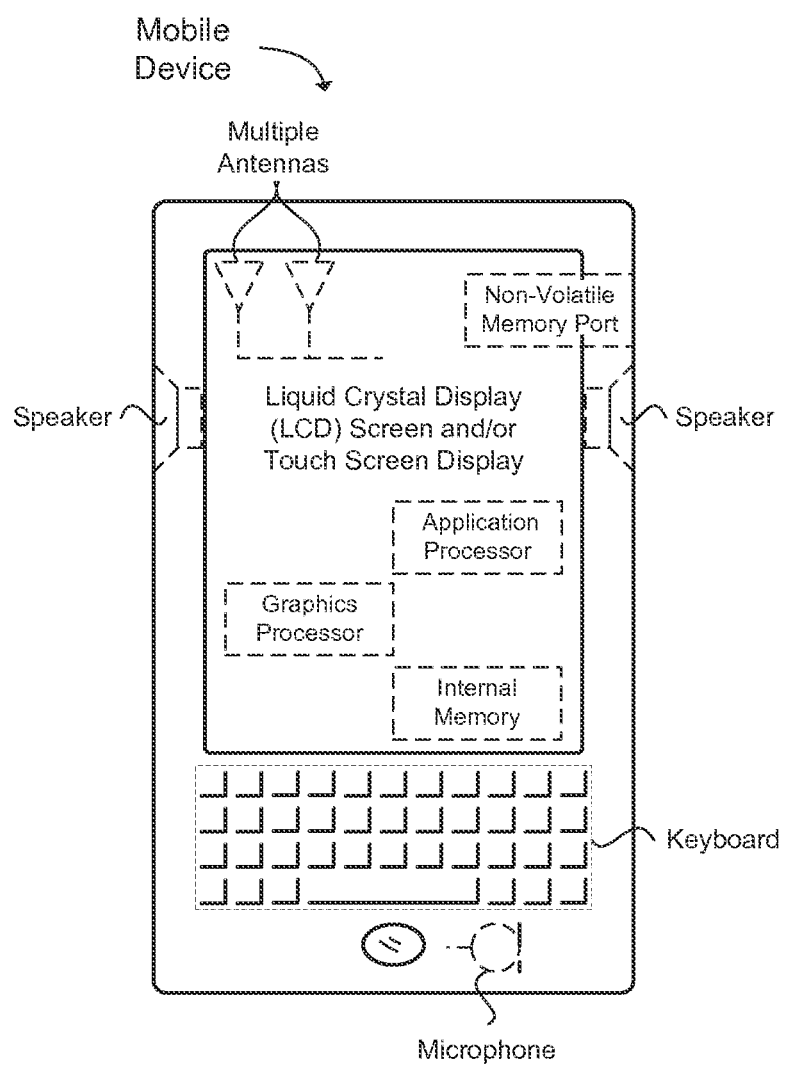
FIG. 11 illustrates a diagram of a wireless device (e.g., UE) in accordance with an example.

FIG. 11 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to report periodic channel state information (CSI), the UE having one or more processors configured to:
   identify a periodic CSI report that is prioritized for transmission to an evolved node B (eNB) when the UE operates in a coordinated multipoint (CoMP) and carrier aggregation (CA) configuration, the periodic CSI report being selected from a plurality of CSI reports, wherein the CSI reports are prioritized based on a physical uplink control channel (PUCCH) reporting type according to a first priority level, wherein the CSI reports are prioritized based on a CSI process index according to a second priority level when PUCCH reporting types for the CSI reports are the same, wherein the CSI reports are prioritized based on a serving cell index according to a third priority level when the PUCCH reporting types and CSI process indexes for the CSI reports are the same;
   generate hybrid automatic repeat request-acknowledgement (HARQ-ACK) feedback for transmission to the eNB;
   combine the HARQ-ACK feedback with the periodic CSI report when the transmission of the periodic CSI report coincides with the transmission of the HARQ-ACK feedback; and
   send the periodic CSI report combined with the HARQ-ACK feedback for transmission to the eNB, wherein the periodic CSI report for CoMP and CA in combination with the HARQ-ACK feedback is transmitted from the UE using a physical uplink control channel (PUCCH) format 3.

2. The UE of claim 1, wherein a selected subframe for transmitting the periodic CSI report to the eNB is configured by higher layers.

3. The UE of claim 1, wherein the HARQ-ACK feedback includes a scheduling request (SR).

4. The UE of claim 1, wherein CSI bits for the periodic CSI report are combined with a sequence of HARQ-ACK bits and a scheduling request (SR) bit.

5. The UE of claim 1, wherein the one or more processors are further configured to select the periodic CSI report among a plurality of periodic CSI reports based on a physical uplink control channel (PUCCH) reporting type of the periodic CSI report, wherein PUCCH reporting types 3, 5, 6, and 2a have a priority higher than PUCCH reporting types 1, 1a, 2, 2b, 2c, and 4, and PUCCH reporting types 2, 2b, 2c, and 4 have a priority higher than PUCCH reporting types 1 and 1 a.

6. The UE of claim 5, wherein the one or more processors are further configured to select the periodic CSI report based on the periodic CSI report having the lowest CSI process index among the plurality of periodic CSI reports, wherein each of the plurality of periodic CSI reports have a same PUCCH reporting type.

7. The UE of claim 6, wherein the one or more processors are further configured to select the periodic CSI report based on the periodic CSI report having the lowest serving cell index among the plurality of periodic CSI reports, wherein each of the plurality of periodic CSI reports have the same PUCCH reporting type and a same CSI process index.

8. The UE of claim 1, wherein the UE includes an antenna, a touch sensitive display screen, a speaker, a microphone, a graphics processor, an application processor, an internal memory, or a non-volatile memory port.

9. A non-transitory machine readable storage medium having instructions embodied thereon, the instructions being executed by one or more processors to perform the following operations:
   identifying, at a user equipment (UE), a periodic channel state information (CSI) report that is prioritized for transmission to an evolved node B (eNB) when the UE operates in a coordinated multipoint (CoMP) and carrier aggregation (CA) configuration, the periodic CSI report being selected from a plurality of CSI reports, wherein the CSI reports are prioritized based on a physical uplink control channel (PUCCH) reporting type according to a first priority level, wherein the CSI reports are prioritized based on a CSI process index according to a second priority level when PUCCH reporting types for the CSI reports are the same, wherein the CSI reports are prioritized based on a serving cell index according to a third priority level when the PUCCH reporting types and CSI process indexes for the CSI reports are the same;
   generating, at the UE, hybrid automatic repeat request-acknowledgement (HARQ-ACK) feedback for transmission to the eNB;
   combining the HARQ-ACK feedback with the periodic CSI report when the transmission of the periodic CSI report coincides with the transmission of the HARQ-ACK feedback; and
   sending the periodic CSI report combined with the HARQ-ACK feedback for transmission from the UE to the eNB, wherein the periodic CSI report for CoMP and CA in combination with the HARQ-ACK feedback is transmitted from the UE using a physical uplink control channel (PUCCH) format 3.

10. The non-transitory machine readable storage medium of claim 9, wherein the HARQ-ACK feedback and the periodic CSI report are jointly coded using up to 22 aggregated information bits.

11. The non-transitory machine readable storage medium of claim 9, wherein the HARQ-ACK feedback includes a scheduling request (SR).

12. The non-transitory machine readable storage medium of claim 9, wherein a payload bit size of the PUCCH format 3 has a maximum payload bit size of 22 aggregated information bits.

13. The non-transitory machine readable storage medium of claim 9, further comprising instructions which when executed by the one or more processors perform the following operation: transmitting the HARQ-ACK feedback without the periodic CSI report from the UE to the eNB when the periodic CSI report combined with the HARQ-ACK feedback are jointly coded using more than 22 aggregated information bits.

14. The non-transitory machine readable storage medium of claim 9, wherein a selected subframe for transmitting the periodic CSI report from the UE to the eNB is configured by higher layers.

15. An evolved node B (eNB) configured to support periodic channel state information (CSI) reporting, the eNB comprising one or more processors configured to:
   receive, from a user equipment (UE) configured for coordinated multipoint (CoMP) and carrier aggregation (CA), a periodic CSI report combined with hybrid automatic repeat request-acknowledgement (HARQ-ACK) feedback using a physical uplink control channel (PUCCH) format 3, wherein the periodic CSI report is for CoMP and CA, wherein:

the periodic CSI report is combined with the HARQ-ACK feedback when a transmission of the periodic CSI report coincides with a transmission of the HARQ-ACK feedback, and the periodic CSI report is selected from a plurality of CSI reports, and the CSI reports are prioritized based on a physical uplink control channel (PUCCH) reporting type according to a first priority level, and the CSI reports are prioritized based on a CSI process index according to a second priority level when PUCCH reporting types for the CSI reports are the same, and the CSI reports are prioritized based on a serving cell index according to a third priority level when the PUCCH reporting types and CSI process indexes for the CSI reports are the same.

16. The eNB of claim 15, wherein the HARQ-ACK feedback includes with a scheduling request (SR).

17. The eNB of claim 15, wherein a selected subframe for receiving the periodic CSI report from the UE is configured by higher layers.

18. The eNB of claim 15, wherein CSI bits for the periodic CSI report are combined with a sequence of HARQ-ACK bits and a scheduling request (SR) bit.

19. A non-transitory machine readable storage medium having instructions embodied thereon, the instructions being executed by one or more processors to perform the following operation:

receiving, at an evolved node B (eNB) from a user equipment (UE) configured for coordinated multipoint (CoMP) and carrier aggregation (CA), a periodic CSI report combined with hybrid automatic repeat request-acknowledgement (HARQ-ACK) feedback using a physical uplink control channel (PUCCH) format 3, wherein the periodic CSI report is for CoMP and CA, wherein:

the periodic CSI report is combined with the HARQ-ACK feedback when a transmission of the periodic CSI report coincides with a transmission of the HARQ-ACK feedback, the HARQ-ACK feedback including a scheduling request (SR), and the periodic CSI report is selected from a plurality of CSI reports, and the CSI reports are prioritized based on a physical uplink control channel (PUCCH) reporting type according to a first priority level, and the CSI reports are prioritized based on a CSI process index according to a second priority level when PUCCH reporting types for the CSI reports are the same, and the CSI reports are prioritized based on a serving cell index according to a third priority level when the PUCCH reporting types and CSI process indexes for the CSI reports are the same.

20. The non-transitory machine readable storage medium of claim 19, wherein a selected subframe for receiving the periodic CSI report from the UE is configured by higher layers.

21. The non-transitory machine readable storage medium of claim 19, wherein CSI bits for the periodic CSI report are combined with a sequence of HARQ-ACK bits and a scheduling request (SR) bit.

* * * * *